United States Patent [19]

Smith-Johannsen

[11] 3,793,716

[45] Feb. 26, 1974

[54] METHOD OF MAKING SELF LIMITING HEAT ELEMENTS

[75] Inventor: Robert Smith-Johannsen, Portola Valley, Calif.

[73] Assignee: Raychem Corporation, Menlo Park, Calif.

[22] Filed: Sept. 8, 1972

[21] Appl. No.: 287,443

Related U.S. Application Data

[63] Continuation-in-part of Ser. No. 88,841, Nov. 12, 1970, abandoned.

[52] U.S. Cl. .................... 29/611, 252/511, 264/105, 338/20

[51] Int. Cl. .................... H05b 3/00

[58] Field of Search. 29/611, 610; 264/105; 338/20, 338/22, 24, 31; 252/511; 117/226

[56] References Cited

UNITED STATES PATENTS

| | | | |
|---|---|---|---|
| 2,683,669 | 7/1954 | Coler | 252/511 |
| 2,808,492 | 10/1957 | Yohe | 29/611 X |
| 3,056,750 | 10/1962 | Pass | 252/511 |
| 3,441,893 | 4/1969 | Gordon et al. | 338/25 X |

*Primary Examiner*—Richard J. Herbst
*Assistant Examiner*—V. A. Dipalma
*Attorney, Agent, or Firm*—Lyon & Lyon

[57] ABSTRACT

A process for manufacturing self-limiting heating elements by casting a semi-conducting composition from solution or fusing a powder. Preferred embodiments of the composition contain conductive carbon black and polyethylene, the black loading being lower than that used in prior art compositions. New constructions, including a multi-wire arrangement, are described.

2 Claims, 8 Drawing Figures

PATENTED FEB 26 1974 3,793,716

METHOD OF MAKING SELF LIMITING HEAT ELEMENTS

CROSS-REFERENCE TO RELATED APPLICATIONS

This is a continuation-in-part of U.S. application Ser. No. 88,841 filed Nov. 12, 1970 now abandoned, and is related in subject to two commonly assigned applications concurrently filed herewith, respectively application Ser. No. 287,442 filed Sept. 8, 1972, and application Ser. No. 287,444 filed Sept. 8, 1972, each entitled "Self-Limiting Conductive Extrudates and Methods Therefor," the disclosure of each of which is incorporated herein by reference.

BACKGROUND OF THE INVENTION

Electrically conductive thermoplastic compositions have previously been achieved by the addition of conductive carbon black to a polymeric base. In one category of such compositions, advantage has been taken of a non-linear positive temperature resistivity coefficient displayed by the particular material to obtain self-regulating or current-limiting semiconductive articles. In U.S. Pat. No. 3,243,753 to Kohler, one such composition is described as containing from 25 percent to 75 percent carbon black about which the polymeric matrix has been formed by in situ polymerization. As the temperature of such a composition increases, either through a rise in ambient temperature or by reason of resistive heating occasioned by the passage of current therethrough, the polymer matrix expands at a rate greater than that of the carbon black particles which, in an interconnected array of channels, impart the property of conductivity. The resulting diminution in the number of current-carrying channels decreases the amount of power generated by $I^2R$ heating. This self-limiting feature may be put to work in, eg, heat tracing pipes in chemical plants for freeze protection, maintaining flow characteristics of viscous syrups, etc. In such applications, articles formed from the conductive composition ideally attain and maintain a temperature at which energy lost through heat transfer to the surroundings equals that gained from the current. If the ambient temperature then falls, increased heat transfer to the surroundings is met by increased power generation owing to the resistivity decrease associated with the article's lowered temperature. In short order, parity of heat transfer and power generation is again attained. Conversely, where ambient temperature increases heat transfer from the conductive article is reduced and the resistivity rise resulting from increased temperature diminishes or stops $I^2R$ heating.

Self-regulating conductive compositions may, of course, be used in employments other than resistive heating, for example, in heat sensing and circuit-breaking applications. In every case, however, the high carbon black content characteristic of most prior art compositions is disadvantageous. High black loadings are associated with inferior elongation and stress crack resistance, as well as low temperature brittleness. In addition, high black loading appears to adversely affect the current-regulating properties of the conductive compositions. If a semi-conductive thermoplastic composition is externally heated and its resistivity plotted against temperature (on the abscissa) the resulting curve will show resistivity rising with temperature from the low room temperature value ($R_i$) to a point of "peak resistance" ($R_p$), following which additional increase in temperature occasions a precipitous resistivity drop associated with the melt phase of the polymer matrix. To avoid resistance runaway with the concomitant irreversible change in resistivity characteristics, the practice of cross-linking the polymer matrix has grown up, in which event resistivity levels off at the peak temperature and remains constant upon further increase in ambient temperature. Cross-linked semiconductive articles with high black loadings exhibit undesirably low resistivity when brought to peak temperature by exposure to very high or low ambient temperatures. In such instances poor heat transfer characteristics can prevent dissipation of $I^2R_p$ generation, causing burnout. For example, one use proposed for such materials is for heating pipes in a chemical plant. Such pipes may be used for transporting materials such as syrups which become extremely viscous if allowed to cool below normal ambient temperatures and which may be spoilt by freezing. Heating tapes are used to keep such pipes above a certain temperature and thermostats are required to control the temperature rise due to the heating tapes. Such pipes are, however, cleaned by passing superheated steam through them and the temperature reached then often exceeds 175°C. It would be desirable to replace the heating tape/thermostat system by a self-limiting element but such an element must be capable of surviving the high temperatures used in cleaning the pipes without a significant change in its resistance (and hence heating) characteristics. The element should also be able to undergo many heating cycles with no significant change in these characteristics.

It would accordingly be desirable to prepare semi-conductive self-regulating articles with substantially lower black contents, with the objects, inter alia, of improving flexural and other physical properties and substantially increasing the ratio $R_p/R_i$. However, attainment of these goals has in large part been precluded by the extremely high room temperature resistivities exhibited by polymers with low black loadings. In Cabot Corporation's Pigment Black Technical Report S-8, entitled "Carbon Blacks for Conductive Plastics" percent carbon-resistivity curves for various polymers containing "Vulcan XC-72", an oil furnace black, show resistivities of 100,000 ohm-cm or more, asymptotically increasing at black loadings of about 15 percent. Others have reported similarly high resistivities with low black loads.

SUMMARY OF THE INVENTION

Briefly, the present invention provides self-limiting conductive articles characterized by low black loadings and room temperature (hereafter, 70°F) resistivities in the range from about 5 to about 100,000 ohm-cm, resistivity R being related to percentage by weight carbon in the composition (L) by the expression $2L + 5 \log_{10} R \leq 45$, the value $R_p/R_i$ at least about 13, preferably at least 50, and most preferably greater than about 1,000.

Such articles may be obtained by forming a solution of an appropriate thermoplastic material in which solution the conductive black is present as a disperse phase and casting the element from solution. It is an object of the present invention to provide a self-limiting heating element which can be heated to or above its normal maximum operating range without destroying it or causing any significant change in its resistance characteristics.

It is a further object of the invention to provide a new method for the manufacture of such elements which makes possible a variety of shapes and constructions in a surprisingly economical fashion.

DETAILED DESCRIPTION OF THE INVENTION

In order to obtain self-limiting compositions, the polymeric matrix in which conductive black is dispersed in whatever proportion must exhibit overall an appropriately non-linear coefficient of thermal expansion, for which reason a degree of crystallinity is believed essential. In trials with non-crystalline polymers such as ethylene-vinyl acetate copolymer (40% VA), polystyrene and styrene-butadiene copolymers, no self-limiting effect has been observed. Generally, polymers exhibiting at least about 20% crystallinity as determined by x-ray diffraction are suited to the practice of the invention. Suitable polymeric candidates include polyolefines such as polyethylene, polypropylene and poly(1-butene), copolymers of ethylene with e.g., 1-butene, 1-hexene, propylene, methacrylic acid, ethyl acrylate and vinyl acetate, polyoxyalkylenes such as polyoxymethylene, polyoxyethylene and polyoxypropylene, fluorocarbon polymers such as polyvinylidene fluoride, polyphenylene sulfide, polymethacrylonitrile, polycarbonate, polyimides such as poly (1,12-dodecamethylene pyromellitimide) as well as mixtures of such polymers or blends of such polymers with less crystalline materials or waxes, all subject to the requirement the crystallinity be such as to impart an appropriately non-linear overall coefficient of thermal expansion to the carbon black-containing matrix of the completed article. As will be recognized by those skilled in the art, limiting temperatures tailored to the application intended (e.g., freeze protection, thermostatting, etc.) may be obtained by appropriate selection of polymeric matrix material. For example, elements which self-limit at temperatures on the order of 100°F, 130°F, 180°F and 250°F may be produced with, respectively, wax-poly(ethylene-vinyl acetate) blends, low density polyethylene, high density polyethylene, polypropylene and polyvinylidene fluoride. Other criteria of polymer selection will, in particular instances, include desired elongation, environmental resistance, etc. as is well known.

The carbon blacks employed are those conventionally used in conductive plastics, e.g., high structure varieties such as furnace and channel blacks. Other conventional addends such as antioxidants, etc., may be employed provided only that their quantities and characteristics do not subvert the objects of the invention. An especially interesting class of beneficial addends, it has been found, are materials such as waxes which, while compatible with the predominant matrix component, melt at lower temperature. The result is to permit obtainment of a given wattage at lower temperature, owing to a first peaking effect of the wax on the resistivity-temperature curve.

The preferred element may be cast, for example, from a solution and dispersion of the polymeric component and carbon black in solvent either by evaporation of the solvent or by lowering the temperature of the solution so that the polyethylene begins to crystallize out. While the invention is by no means to be limited by the following tentative hypothesis, it is believed that as the polymeric component comes out of solution (in which state the carbon black is relatively uniformly dispersed) crystallization begins and carbon particles are excluded from the crystalline regions, until finally the carbon particles are confined to the amorphous zones. It is appreciated that this is a somewhat naive hypothesis ignoring, as it does, the possibility that the carbon black particles influence the manner of growth of the crystalline regions from the solution. However, it appears to fit the facts, as they are known at this time.

The self-limiting heating element of the present invention may also be manufactured from its component non-conductive crystalline thermoplastic and conductive particulate materials without the use of a solvent provided that the initial particle size of the thermoplastic material is smaller than about 300 mesh (American Standard mesh size) and preferably about 500 mesh. If this condition is met, the element may be made by blending the components together dry, at ambient temperature, applying the blend to a substrate, heating above the crystalline melting point of the thermoplastic and annealing. Alternatively, the dry mixture may be dispersed in any suitable liquid and the element formed by applying the mixture to a substrate, heating to drive off the liquid and then fuse the polymer, and cooling.

By the process of the present invention, a self-limiting heating element may be manufactured in any one of a number of configurations. For example, the element may be applied directly to the surface of an article which it is to heat, for example, a tray, beaker, or cup, electrodes being provided at any desired points or areas on the surface. Heating elements may be made in the form of laminae, ribbons, or films, supported or unsupported. An especially useful form of the product is as a "twisted pair" of wires, in which a pair of conducting wires, for example of copper, are "insulated" from one another by the composition of the invention. When corresponding ends of the wires are connected to a source of electric current, the "insulation" between them acts as a series of parallel resistors, carrying current from one wire to the next. As, for all practical purposes, the copper wires have zero resistance, the heating effect of the wire is constant over a considerable length from the power source. To prevent direct contact between the conductors, and to control their separation, an insulating braid (of, for example "Nomex" or glass) may be placed around each conductor, or the conductors may be separated by insulating fillers.

It has unexpectedly been found that the resistivity (as measured in ohm-cm) of the product according to the invention is very low compared with that of prior art polymers containing conductive carbon black having a similar carbon/polymer ratio. For example, polyethylene containing Conductex SC carbon black requires 24.5 percent carbon to give a resistivity as low as 100 ohm-cm. An element constructed in accordance with the present invention having a resistivity of 100 ohm-cm contains, in contrast, only 5 to 12 percent carbon black.

Accordingly, there is also provided a self-limiting heating element comprising a composition comprising conductive carbon black and a suitable crystalline polymer, the composition having a resistivity between about 5 and 100,000 ohm-cm, the relation of the carbon black loading and the resistivity satisfying the equation $$2L + 5 \log_{10} \leq 45$$

wherein L is the percentage by weight of the carbon black and R is the resistivity in ohm-cm, and preferably, when the resistivity is between about 100 and 10,000 ohm-cm, satisfying the equation $$2L + 5 \log_{10} \leq 40$$

Some difficulty in electrically insulating self-limiting heating elements of certain constructions has been experienced in the past since to achieve an effective insulation that is also impermeable to water, corrosive chemicals and even air it is necessary to apply an insulation directly to the element itself. This often changes the electrical characteristics of the element since, to achieve effective protection, the insulating material must be bonded to the element by some chemical, thermal or mechanical process, such as by an adhesive, heat sealing, pressure or a combination thereof. Such treatment will cause some diffusion of chemical transformation in the element changing its properties in some way, usually adversely and always to an unpredictable or non-reproducible extent.

The present invention also accordingly provides an insulated self-limiting heating element in which the element has a primary insulation comprising a room temperature vulcanizing silicone (RTV Silicone). Such compositions are commercially available but it could not have been predicted that they would yield an insulation that could be applied without substantially affecting the resistance characteristics of the element. Further, they give an insulating material capable of adoption to any surface characteristics (such as roughness) on the product, and have good low and high temperature performance.

As a practical matter, it is necessary to anneal the elements of the present invention at temperatures above the crystalline melting point in order to allow for proper wetting and leveling of the conductive mixture to the substrate. When this is done, the element is reproducible.

Some embodiments of the self-limiting heating elements of the present invention will now be described in greater detail by way of example only with reference to the accompanying drawings in which FIG. 1 is an isometric view of a first embodiment in the form of a ribbon or tape;

Figures 1, 2:
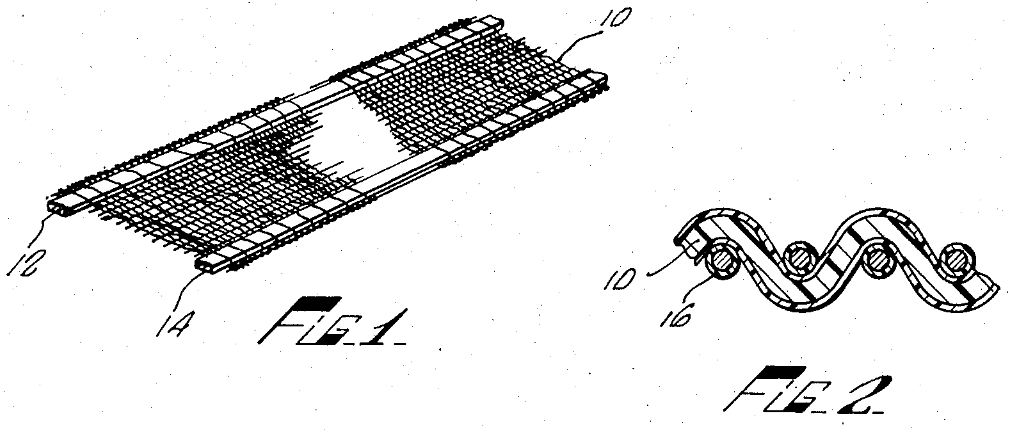
FIG. 2 is an enlarged sectional detail of the embodiment of FIG. 1.

Referring now to the drawings, and more especially to FIGS. 1 and 2, the first embodiment comprises a woven non-absorbent glass-cloth ribbon 10, having integrally woven therein a pair of copper conductors 12, 14 of rectangular cross-section extending along each margin of the ribbon inset and a short distance from each edge. A carbon black-loaded polyethylene composition 16 impregnates the ribbon 10.

Figure 3A:
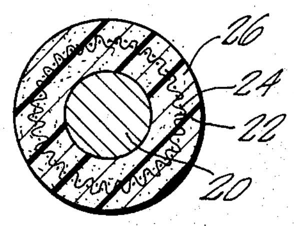
FIGS. 3A, 3B and 3C illustrate in cross-section the stages of manufacture of a second embodiment in the form of a wire.

Referring now to FIG. 3A there is shown an electrical conductor 20 in the form of a copper wire having applied thereto a first annular layer 22 of carbon black-loaded polyethylene. Surrounding his first layer 22 is a circular braiding 24 of a suitable non-conducting, non-absorbent but permeable material for example "Nomex." Surrounding this braid layer is a second annular layer of carbon black-loaded polyethylene 26.

Figure 3B:
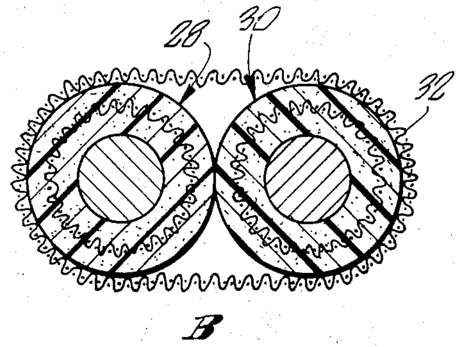

Referring now to FIG. 3B two such coated conductors 28 and 30 are shown formed into a contiguous pair by a surrounding layer 32 of suitable braid material, for example "Nomex". ("Nomex" is a trade name for an aromatic polyamide, made by E. I du Pont de Nemours and Co.)

Figure 3C:
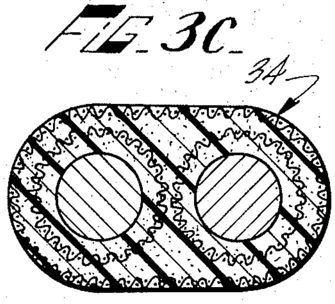

Referring now to FIG. 3C the final form of the second embodiment is shown, after heating. The polyethylene layers of the coated conductors 28 and 30 have coalesced, the circular braids thereof are now in substantial contact and the outer braid 32 has compressed the whole into a unified structure 34.

Figure 4A:
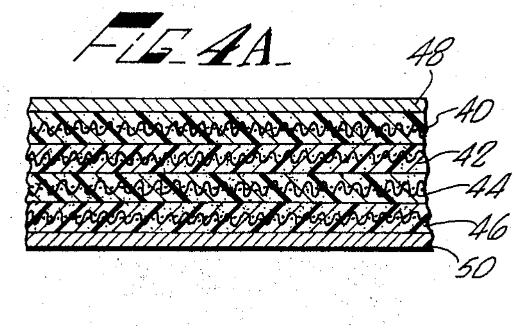
FIGS. 4A and 4B illustrate in cross-section the stages of manufacture of a third embodiment.
Figure 4B:
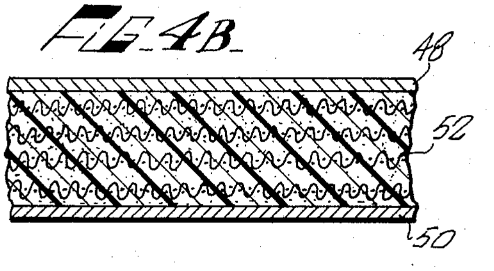

FIGS. 4A and 4B illustrate another embodiment of the present invention. As shown in FIG. 4A, a plurality of layers 40, 42, 44, 46 of glass cloth impregnated with carbon black-loaded polyethylene are laminated between a pair of aluminum foil electrodes 48 and 50. This laminated structure is then subjected to heat and pressure and then cooled. The resulting structure is shown in FIG. 4B. As can be seen, the polyethylene components of the layers 40, 42, 44 and 46 have coalesced to form a unitary conductive block.

Figure 5:
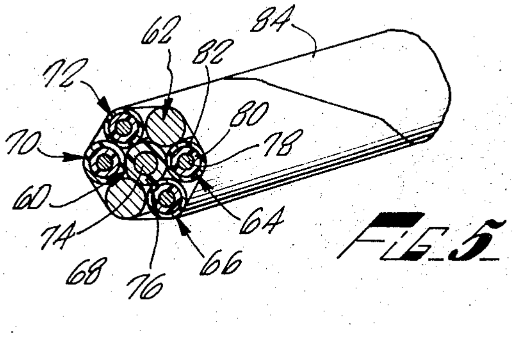
FIG. 5 is an isometric view partly in section of a fourth embodiment of the present invention.

FIG. 5 illustrates a further embodiment of the present invention. As illustrated, a central core member 60 is surrounded by a plurality of further longitudinal members 62, 64, 66, 68, 70 and 72. The core member 60 may either be an insulating rod or may be, as shown, a wire comprising a conductor 74 covered with an insulating coating 76. The members 62 and 68 are electrically conductive and may be, for example, fabricated of copper. Each of the members 64, 66, 70 and 72 comprise a conductive core 7B and insulating coating 80 and a further coating 82 of the carbon-loaded polyethylene composition. If desired, an insulating rod can be used instead of the conductor 78 and insulation 80. The entire structure is tightly wrapped with a suitable tape 84 which, for example, may be Mylar. After fabrication, the element of FIG. 5 is subjected to heat to cause the polyethylene coating on each of the members 64, 67, 70 and 72 to coalesce to form conductive paths between the conductors 62 and 68. The other members are dummies. If desired, the core member 60 and the conductors 62 and 68 may also be coated with the carbon black-loaded polyethylene.

EXAMPLE 1

Shawinigan conductive acetylene black, 57.5 g., was passed through a high impact fluid energy mill and then dry mixed for one minute with 500 g. Eastman Tenite 812 low density polyethylene in a Waring Blendor. The dry mixture was added to 1,000ml. (1625 g.) of tetrachloroethylene contained in a 3 liter beaker, and the new mixture heated with stirring to 110°C. A viscous black dispersion was obtained.

A glass cloth tape of 1.25 in. width having ⅛ in. copper foil strips woven into the fabric near each edge of the tape, and spaced 0.9 in. apart, served as the substrate. The tape was sized by dipping it into a 30 percent by weight solids aqueous colloidal silica dispersion (du Pont 130M) and removing the excess by an "air knife." The tape was then dried under tension in a radiant heating oven.

The sized tape was coated by preheating at 100°C and immersing it in the hot conductive mixture prepared and described above and then drawing the coated tape through a nip roll having a 0.030 in. separation, and immediately dried by passing it at 4 ft. per minute through a 10 ft. vertical oven the temperature of which rose from 100°C at the bottom to 210°C at the top. By this process a uniform coating of approximately 2.45 g./ft. was applied. The coated element was then heated for 10 minutes at 150°C and cooled slowly to give the finished element.

The element had a room temperature resistance of 16,000 ohms/in. The resistance was 170,000 ohms/in. at 82°C and 1,800,000 ohms/in. at 97°C. Upon cooling to room temperature the element returned to 16,000 ohms/in. resistance. Heating the element to 150°C for 15 minutes caused the initial room temperature resistance to increase to 16,500 ohms/in. while the resistance change with temperature remained essentially the same (175,000 ohms at 82°C; 1,800,000 ohms at 100°C). Subsequent heatings to 150°C imparted no further changes in the room temperature resistance. When energized with 130 volts under a ¾ in. glass wool insulation blanket the element limited itself to a temperature of 61°C. The limiting temperature under the same conditions when energized with 200 volts was 73°C.

The above element was insulated by coating it with approximately 0.003 in. of General Electric RTV Silicone 630 and sandwiching this coated film between two 0.005 in. layers of etched Teflon film. After curing 16 hours at room temperature, the insulated element was heated to 150°C for 45 minutes. The resulting element had a room temperature resistance of 17,000 ohms/in. and a maximum resistance of about 1,500,000 ohms/in. at 95°C.

EXAMPLE 2

A mixture of 100g. U.S. 1. Microthene NF 500 low density polyethylene powder and 8.0g. of fluid milled Shawingan conductive acetylene black was mixed in a Waring Blendor for 1 minute and then added to 150 ml. of xylene. A black dispersion was obtained.

When coated onto a sized glass cloth element as described in the previous example, the element had a room temperature resistance of 21,500 ohms/in. The resistance at 105°C was 270,000 ohms/in.

EXAMPLE 3

Approximately 20 ml. of the hot dispersion described in Example 1 was poured onto a glass plate and drawn down to a 0.010 in. thick film by means of a doctor blade. The plate and film were then placed in a 150°C oven for 15 minutes. After cooling a 1 in. sq. section of this film was cut, separated from the glass plate and ⅛ in. copper bus bars were firmly impressed into two opposite sides of the film. This film had a room temperature resistance of 95,000 ohms. When energized with 120 volts under a 1 in. blanket of glass wool, the element limited itself to 67°C.

EXAMPLE 4

Screened Shawinigan conductive acetylene black, 8.5 g. and 100 g. of Tenite 812 polyethylene were mixed in a Waring Blendor for 1 minute and then added to 200 ml. of xylene contained in a 500 ml. beaker. The mixture was heated to 100°C with stirring until the polyethylene was dissolved.

Glass cloth scrim (15 picks per in. warp and weft, 0.005 in. thickness) was impregnated with the hot xylene solution by dipping the cloth into the solution then drying in a forced air oven for 15 minutes at 150°C. Five layers of coated scrim were then placed between exterior layers of etched aluminum foil of 0.002 in. thickness and placed in a laminating press. Using shims of 0.03 in. thickness to control the degree of compression, the laminate was pressed at 10,000 lb. pressure and heated to a temperature of 150°C. After coming to temperature equilbrium it was cooled slowly under pressure to room temperature. The finished element could be sheared to any desired shape or size.

A 1 sq. in. section of the laminate had a room temperature resistance of 7,200 ohms and developed approximately 2 Watts/in.$^2$ at room temperature when energized on 120 volts. Under a 2 in. glass blanket, it had a limiting temperature of 60°C when energized on 120 volts.

EXAMPLE 5

A multistranded copper wire (19 strands, 36 AWG) was coated with the conductive carbon mixture described in Example 1 by drawing the wire preheated to 100°C through the hot mixture, removing the excess by drawing the wire through a 0.036 in. "star die" and then drying the coating by passing the coated wire at 20 ft. per minute through a 10 ft. vertical oven with a temperature rising from 100°C at the bottom to 210°C at the top. The wire was covered with Nomex braid (0.007 in. thick and 70 percent coverage). It was then recoated with conductive mix in the manner previously described, drawing it through a 0.05 in. "star die".

Two such coated wires were then braided together with Nomex to 100 percent coverage. The combined wires were heated for 45 minutes at 150°C allowing the separate coatings to fuse together and form a uniform conductive pathway between the two wires. The element was then insulated by extruding a layer of Kynar of thickness 0.005 in. around it.

The wire had a room temperature resistance of 20,000 ohms/ft. The resistance at 82°C was 800,000 ohms/ft. and at 98°C it was 7,900,000 ohms/ft. After heating at 150°C for 10 minutes the element returned to its original room temperature resistance (20,000 ohms/ft.).

EXAMPLE 6

Two ⅛ in. copper foil strips were adhered to the opposite sides of a 1l. glass beaker. Three layers of the glass cloth scrim used in Example 4 were then wrapped around the beaker. The assembly was preheated to 150°C and the hot conductive solution of the type described in Example 4 (using 15 g. carbon black to 100 g. polyethylene) was painted by means of a brush onto the scrim. After the scrim was saturated the assembly was baked for 20 minutes in a 150°C oven.

The resultant coating developed 100 Watts on 120 volts and had a limiting temperature of 75°C.

EXAMPLE 7

A mixture of 100 g. Eastman Tenite 812A low density polyethylene with 10.0 g. of Cabot Corporation Vulcan XC–72 (conductive carbon black) blended for 1 minute in a Waring Blendor. The dry mixture was stirred into 200 ml. of xylene contained in a 1l. beaker.

The mixture was heated with stirring to 120°C. A viscous, black dispersion was obtained.

This conductive mixture was coated onto the glass cloth tape substrate described in Example 1 by dipping 1 ft. sections of the tape into the solution and drawing them through a heated nip bar assembly with a separation of 0.03 in. The coated samples were dried by heating for 10 minutes at 150°C. Three samples prepared in this manner had room temperature resistances of 6,000, 7,000 and 7,500 ohms/in. respectively. The 7,000 ohms/in. sample when heated had a resistance of 50,000 ohms/in. at 82°C and 70,000 ohms/in. at 88°C.

Repeating this experiment using screened Shawinigan conductive acetylene black in place of the Vulcan XC-72 (all other quantities and conditions the same) gave samples with room temperature resistances of 16,500, 14,500 and 17,000 ohms/in. respectively. The 17,000 ohms/in. sample when heated had a resistance of 1,250,000 ohms/in at 82°C and 10,000 ohms/in. at 94°C.

EXAMPLE 8

Fifty g. of Union Carbide DNDA 0917 low density polyethylene (0.915 density; 23 melt index, m.p. 102°C) was added to 300 ml. of xylene contained in a 1l. beaker and dissolved by heating to 120°C with stirring. To this solution was added 1.83g. of screened Shawinigan conductive acetylene black. The resulting hot mixture was stirred for 1 hour and then used as a coating for glass cloth elements in the manner described in Example 7. Three samples thus prepared had room temperature resistances of 28,000, 28,000 and 25,000 ohms/in. respectively. The 25,000 ohms/in. sample when heated had a resistance of 67,500 ohms/in. at 802 C and 110,000 ohms/in. at 87°C.

EXAMPLE 9

Fifty g. of poly(vinylidene fluoride) (Diamond Shamrock Dalvor) were dissolved in 150 ml. of dimethyl acetamide by heating to 150°C with stirring. To this hot solution was added 2.08 g. of fluid energy milled Shawinigan conductive acetylene black. The hot mixture was stirred for 15 minutes and then used as a coating for a glass cloth element in the manner previously described. The coated tape was dried for 10 minutes at 200°C. This tape had a resistance of 18,000 ohms/in. at room temperature. When heated the element exhibited the following resistances: 82°C, 25,200 ohms/in.; 93°C, 31,800 ohms/in.; 104°C, 42,000 ohms/in.; 116°C, 53,500 ohms/in.; 58,800 ohms/in.; 138°C, 75,600 ohms/in.; 149°C, 93,000 ohms/in.; 160°C, 126,000 ohms/in.; 171°C, 156,000 ohms/in. Upon cooling to room temperature the resistance returned to 20,400 ohms/in.

EXAMPLE 10

In this example, a series of test elements was made up with different carbon black loadings and the resistivities measured. From the results, it is a simple matter to interpolate or extrapolate to obtain the required loading for any desired resistivity of heating element.

Various percentages of Shawinigan carbon black were dry blended with polyethylene and the resulting mixture added to xylene as described in Example 1. A film was cast on a glass plate, and the resistivity measured. The results are set out in Table 1.

TABLE I

| % Carbon black | Resistivity, ohm-cm. |
|---|---|
| 6.5 | 70,000 |
| 8.6 | 407 |
| 11.0 | 133 |
| 17.5 | 7.4 |

By the procedure of Example 8, various percentages of Shawinigan acetylene black were incorporated into polyethylene. The resistivities are set out in Table II.

TABLE II

| % Carbon black | Resistivity, ohm-cm. |
|---|---|
| 2.0 | 2,640 |
| 3.0 | 970 |
| 3.5 | 520 |
| 4.0 | 310 |
| 4.5 | 128 |
| 5.0 | 91.4 |
| 11.0 | 7.8 |

In contrast of these results, Technical Services Report No. 207, dated April 1966, of the Columbian Carbon Company, describes the properties of a polyethylene loaded with Conductex SC carbon black, a material designed for specialized uses involving electrical conductivity. From a chart in that report, Table III was prepared.

TABLE III

| % Carbon black | Resistivity, ohm-cm. |
|---|---|
| 14.0 | 100,000 |
| 18.5 | 10,000 |
| 21.0 | 1,000 |
| 24.5 | 100 |
| 35.5 | 10 |

Thus, it can readily be seen that to obtain resistivities between 5 and 70,000 ohms/cm. the carbon black loadings required by the present invention are substantially lower than anything achieved by the prior art.

EXAMPLES 11-18

Herein, the formation of self-limiting elements with various two component matrices is demonstrated. Essentially following the procedure of Example 8, carbon black was added to solution last in each case. Formulation proportions are stated in Table IV, while Table V contains additional protocol and reports resistivity of the coated element at elevated and room temperature.

TABLE IV.—Blend Coating Formulation

| Example | 11 | 12 | 13 | 14 | 15 | 16 | 17 | 18 |
|---|---|---|---|---|---|---|---|---|
| Tenite 812 [a] | 100 | 100 | 50 | | | | | |
| Microthene F [b] | | | | | 100 | | | 100 |
| Elvax 260 [c] | | | | 30 | | 30 | | |
| Elvax 460 [c] | | | 50 | | | | | |
| Phillips 885 [d] | | | | | | | 100 | |
| Vistanex L-80 [e] | | 6 | | | | | 9 | 6 |
| Nordel 1040 [f] | | | | | | | | |
| Bareco 195 wax [g] | | | | 100 | 20 | | | |
| Chevron 160–165 wax [h] | | | | | | 100 | | |
| Vulcan XC-72 [i] | | | | | | | | |
| Parts | 10 | 12 | 12 | 12 | 14.5 | 12 | 12 | 15 |
| Percent wt | 8.6 | 10.2 | 10.7 | 8.45 | 10.8 | 8.45 | 9.9 | 12.4 |

[a] Low density (0.912) high melt index polyethylene, Eastman Chem. Co.
[b] Medium density (0.934) low melt index polyethylene, U.S. Industrial Chem. Co.
[c] Ethylene vinyl acetate copolymers respectively with 28% and 18% vinyl acetate, DuPont Co.
[d] High density (0.965) polyethylene (melt index 30), Phillips Petroleum Co.
[e] Polyisobutylene, Exxon Chem. Co.
[f] Ethylene-Propylene-1,4-hexadiene terpolymer, DuPont Co.
[g] Microcrystalline wax, Petrolite Co.
[h] Fully refined paraffin wax, Chevron Chem. Co.
[i] Oil furnace black, Cabot Corporation.

TABLE V

Resistivity of Blend Coated Elements

| Example | Solvent | Drying Room (141.5°C) min. | Temp. Resistivity ohm-cm | Resistivity at elevated temperature ohm-cm |
|---|---|---|---|---|
| 11 | Perchloroethylene | 20 | 1050 | 40,900 at 95°C |
| 12 | " | 20 | 268 | 79,000 at 95°C |
| 13 | " | 20 | 163 | 440 at 77°C |
| 14 | None | 10 | 332 | 5,450 at 76°C |
| 15 | Perchloroethylene | 20 | 1063 | 33,800 at 95°C |
| 16 | None | 10 | 585 | 193,200 at 69°C |
| 17 | Solvent 360 | 20 | 129 | 1270 at 95°C |
| 18 | Perchloroethylene | 20 | 164 | 1970 at 95°C |

Each of the blended compositions above exhibit resistivity at room temperature related to black loading by the equation $2\,L + 5\log_{10} R \leq 37$.

EXAMPLE 19

A construction of the configuration illustrated in FIG. 5 was manufactured on a planetary cabler. Conductors 62 and 68 were 22 AWG copper wire, the remaining five units being 28 AWG stranded copper insulated by poly(1,12-dodecamethylene pyromellitimide) having a 0.002 in. coating of the composition of Example 1, the assembly being given a 1 in. lay. The insulation was a 0.001 in. thick, 0.5. wide "Mylar" tape, wound with a 40 percent overlap. The construction was heated in an oven at 150°C to fuse the layers of conductive composition.

What is claimed is:

1. A process for the manufacture of a self-limiting heating element which comprises the steps of A. blending conductive carbon black with a crystalline thermoplastic polymeric material, the weight of carbon black being at most about 15 percent by weight of the blend;

B. dissolving the polymeric component of the blend formed in step (A) in a solvent therefor above the crystalline melting point thereof;

C. coating an elongate electrical conductor with the solution resulting from step (B), evaporating and the solvent;

D. applying a braid to the coated electrical conductor resulting from step (C);

E. repeating step (C) on the product of step (D);

F. contacting at least two dual-coated conductors resulting from step (E) so that the conductors are substantially parallel;

G. applying a braid around the assembly resulting from step (F);

H. heating and annealing the braided assembly resulting from step (G) to cause melting of the polymeric blend component and consolidation of the assembly into a stable structure.

2. A process as claimed in claim 1, wherein said elongate electrical conductor is a wire.

* * * * *